United States Patent
Dipaula

(10) Patent No.: US 12,030,235 B2
(45) Date of Patent: Jul. 9, 2024

(54) TRANSPORTABLE AND PORTABLE BOARD BENDING MACHINE SYSTEM

(71) Applicant: Timothy Joseph Dipaula, Westminster, MD (US)

(72) Inventor: Timothy Joseph Dipaula, Westminster, MD (US)

( * ) Notice: Subject to any disclaimer, the term of this patent is extended or adjusted under 35 U.S.C. 154(b) by 0 days.

(21) Appl. No.: 17/650,734

(22) Filed: Feb. 11, 2022

(65) Prior Publication Data

US 2022/0250304 A1  Aug. 11, 2022

Related U.S. Application Data

(60) Provisional application No. 63/148,364, filed on Feb. 11, 2021.

(51) Int. Cl.
| | |
|---|---|
| *B29C 53/04* | (2006.01) |
| *B29C 53/84* | (2006.01) |
| *E04F 11/16* | (2006.01) |
| *B29L 31/10* | (2006.01) |

(52) U.S. Cl.
CPC ............. *B29C 53/04* (2013.01); *B29C 53/84* (2013.01); *E04F 11/166* (2013.01); *B29L 2031/104* (2013.01)

(58) Field of Classification Search
CPC ....... B29C 53/04; B29C 53/84; B29C 53/043; B29C 63/04; E04F 11/166; B29L 2031/104; B65H 45/00; B31F 1/0003
See application file for complete search history.

(56) References Cited

U.S. PATENT DOCUMENTS

| | | | |
|---|---|---|---|
| 1,506,096 A * | 8/1924 | Stidworthy | ............ B21D 5/042 269/236 |
| 1,872,482 A | 8/1932 | Joseph | |
| 2,077,508 A | 4/1937 | Bierer | |
| 2,937,689 A | 5/1960 | Peterson | |

(Continued)

FOREIGN PATENT DOCUMENTS

| | | |
|---|---|---|
| CN | 103357713 A | 10/2013 |
| CN | 103624119 A | 3/2014 |

(Continued)

*Primary Examiner* — Christopher M Rodd
*Assistant Examiner* — Shibin Liang
(74) *Attorney, Agent, or Firm* — Rosenberg, Klein & Lee

(57) ABSTRACT

A transportable/portable bending machine for arcuately contacting an end section of a synthetic resin or plastic composition planar member which includes a frame having a substantially planar frame base member. The machine includes a heating assembly mounted within the frame below the planar frame base member to heat an end section of the synthetic resin or plastic composition to a temperature which allows the end section to become pliable. A forming mechanism includes a cylindrical bar and a rotatable forming member for arcuately forming the end section of the resin or plastic composition planar member around the cylinder bar. An adjustment height mechanism adjusts the displacement distance between an upper surface of the planar frame base member and the cylindrical bar with an adjustable and rotatable lever mechanism connected to the forming mechanism for arcuately displacing the forming mechanism through a predetermined arc length.

24 Claims, 12 Drawing Sheets

(56) References Cited

U.S. PATENT DOCUMENTS

| | | | | |
|---|---|---|---|---|
| 2,990,000 | A * | 6/1961 | Mangus | B41D 5/00 29/243.57 |
| 3,149,376 | A | 9/1964 | Andrew | |
| 3,616,076 | A | 10/1971 | Gepkens | |
| 3,668,033 | A | 6/1972 | Evans | |
| 3,888,613 | A | 6/1975 | Fries et al. | |
| 3,946,588 | A | 3/1976 | Mayston | |
| 3,982,990 | A * | 9/1976 | Goebel | B29D 99/0039 156/538 |
| 3,994,656 | A * | 11/1976 | Van Ausdall | B29C 53/043 264/339 |
| 4,035,224 | A * | 7/1977 | Anderson | B29C 63/04 156/499 |
| 4,334,947 | A * | 6/1982 | Zaino | B29C 53/043 156/499 |
| 4,490,205 | A * | 12/1984 | Warhol | B62D 65/00 156/499 |
| 4,557,684 | A | 12/1985 | Romine et al. | |
| 4,756,863 | A * | 7/1988 | Petershofer | B29C 53/04 425/374 |
| 5,112,210 | A * | 5/1992 | Weissfloch | B29C 53/04 425/383 |
| 5,575,169 | A * | 11/1996 | Banse | B21D 5/04 72/319 |
| 5,680,789 | A * | 10/1997 | Brooke | H02G 1/14 72/216 |
| 2011/0265546 | A1* | 11/2011 | Wilson | B21D 5/042 72/319 |
| 2013/0234358 | A1* | 9/2013 | Mildner | B29C 53/84 264/145 |
| 2020/0131779 | A1 | 4/2020 | Nedza | |

FOREIGN PATENT DOCUMENTS

| | | |
|---|---|---|
| CN | 207403163 U | 5/2018 |
| GB | 996025 * | 5/1962 |
| JP | S5584622 A | 6/1980 |

* cited by examiner

TRANSPORTABLE AND PORTABLE BOARD BENDING MACHINE SYSTEM

REFERENCE TO RELATED APPLICATION

This Application claims benefit of Provisional Application 63/148,364 filed on Feb. 11, 2021.

FIELD OF THE INVENTION

This invention is directed to the field of contouring a section of a board member.

This invention is related to the arcuate contouring of a section of a board member for use in edifices.

This invention is further directed to arcuately forming a board member section composed of a synthetic resin or plastic composition.

This invention is further directed to the area of bending an end section of a vinyl tile board for use in edifices.

This invention is additionally related to bending of a vinyl tile board section for accommodation and placement on stairways within an edifice.

This invention is directed to the field of fitting a contoured board section to a stair step to provide a seamless interface between the board member and the flooring on the surface of a stair step.

This invention is further related to the field of heating a vinyl tile board end section into a pliable state and maintaining an arcuate section for an arcuately formed end section for insert onto a stair step.

This invention is further directed to the field of bending a vinyl tile board section having an arcuately formed end section for use in building applications.

More in particular, this invention is related to fabrication of slip-over tread covers for stairs.

Further, this invention is directed to formable slipcovers for being fixedly secured and attached to an upper surface of a stair step for interfacing with flooring.

More in particular, this invention is directed to slip-over tread covers which are formed of a vinyl-like composition and formed into mating engagement with flooring of floor steps.

BACKGROUND OF THE INVENTION

Vinyl flooring is a popular floor covering option used in numerous applications for stairways. In flooring projects, transitions between rooms and step-downs are generally needed in order to complete an installation.

As pertaining to FIG. 1, prior art transitions are designed to lay on the surface of flooring which covers a stair. As is seen in FIG. 1, this type of arrangement would inadvertently create a speed bump and a potential tripping hazard in many uses. Slip overs are generally needed and provided, however, there are no known matching slip over tread covers which interface in a seamless fashion with the flooring of a stair step. Additionally, as can be seen in FIG. 1, the overall appearance of the slip over tread cover may generally provide a space between an end section of the slip over tread cover and cause a potential deformation of the slip over tread cover at an end area due to a gap formed between the slip over tread cover and the stair step.

Prior art systems for bending plastic composition type sheets are known in the art. U.S. Pat. No. 1,872,482 directs itself to a process of bending laminated sheets. In this prior art, a stationary table system includes both a stationary and a movable table where the movable table is pivotal an axis. The stationary table and the movable table form the bed upon which the laminated sheets are positioned and a die member is held in a slot in an extension on the stationary table through means of a threaded screw to form an abutment around which the material is bent. An adjustable stop bar held in place by means of bolts or some like securing mechanism comprises one of the compression members and a plate is adjustably held on a movable portion of the pivotally movable table. A plurality of burners are provided on the machine for heating the material along a line of bending to produce a bending of the laminated sheets. However, such prior art systems do not provide for a portable and transportable sheet bending system which includes a heater oven below a frame base member, as is found in the subject application system to provide a transportable and portable bending machine which can be easily transported to on-site locations if necessary. Such systems additionally such prior art systems do not provide for the same or similar bending process needed for accurately bending a particular section of a synthetic resin or plastic composition, as is necessary in forming a seamless transition provided by the subject application.

Other prior art such as that shown in U.S. Pat. No. 2,937,689 are directed to bending machines where a sheet of plastic composition is positioned on a backing member having a contoured edge. A contact adhesive is used for securing the plastic sheet to the backing member, and there is a work-supporting member/hold-down bar combination extending throughout the length of the material bending system. The plastic material is then held down by the hold-down bar and a heater is used for heating a portion of the plastic material to bend over a contoured edge. Subsequent to the heating, the heater is moved away from the material and a pressure foot is drawn into position to further hold the plastic sheet. A roll bar is then pivoted in contact with the material to form a portion of the plastic sheet into a bend. Such prior art does direct itself to the bending of plastic-like compositions, however, does not provide for the combination of a base surface upon which the plastic is mounted with a forming mechanism which is lever-actuated to arcuately contour a predetermined section of the plastic-like material into an appropriate arcuate contour with an all-inclusive heating oven placed below the base surface to provide a transportable and portable type bending machine, as is necessary to the subject application system.

Other prior art systems, such as that shown in U.S. Pat. No. 4,557,684 are directed to benders for synthetic resin plates. A rectangular base with a horizontal surface is provided with the bender having a clamping mechanism including a lever pivotally connected to a side piece of the machine. The clamping mechanism has a resilient clamp pad and a rectangular support with the machine having a further rectangular brace attached to a hinge and a forming bar. However, as is in all known prior art systems of this type, the combination of elements does not allow for a transportable and portable system with an all-inclusive bending mechanism and a forming mechanism, as well as a heating oven disposed beneath the base member where a thermostatically controlled mechanism heats the oven to a predetermined temperature prior to insertion into a forming mechanism, as is necessary to the subject application system.

Other types of prior art, such as that described in Chinese Patent Publication #207403163 reference, direct themselves to plastic-like bending systems which include a flat panel and a backing plate in order that there be a bending line positioned at a corner of an indentor. An air cylinder controls the indentor to descend and press the plastic sheet. This includes a separate cooling tower with a water storage tank. A heating component initiates heating and when a specified temperature is reached, the heating component is turned off and a hydraulic type system is used for bending the plastic material around a die. However, such systems do not provide for the type of transportable and portable bending machine of the subject application where the subject application includes an all-inclusive set of elements which allows the bending machine to be transportable and portable machine, as is necessary to the subject application system. Such prior art relies upon hydraulic type actuation systems to bend the plastic material around a die, in opposition to the subject application system which provides for a lever-operated forming mechanism and a rotatable cylindrical bar to provide an even forming of the plastic material to be arcuately contoured. Such systems do not provide for a base frame with an oven beneath the base frame for the heating to a predetermined temperature, as is necessary to the subject application system.

Thus, there is a long held need in the industry to provide a portable/transportable type bending apparatus which can easily be moved from one location to another and includes a combination of elements which provides for a heating oven below a base surface in combination with a cylindrical bar member and a forming mechanism which can be easily displaced through the use of an adjustable and controllable lever member.

SUMMARY

An object of the subject system is to provide a transportable/portable board bending machine.

A further object of the subject system is to provide a board bending machine which is simple to operate and includes a combination of elements including an oven below a base surface upon which material to be arcuately contoured is positioned.

A further object of the subject system is to provide a portable/transportable board bending machine which is adjustable to accommodate selected thicknesses of a board member to be arcuately contoured or bent.

A still further object of the subject invention is to provide a transportable/portable board bending machine which is specifically designed for arcuately contouring an end section of a synthetic resin or plastic composition board member.

An additional object of the subject invention is to provide a transportable/portable board bending machine where the board composition is a vinyl composition.

An object of the subject transportable/portable bending machine is to provide a board bending of a specific end section of a vinyl tile board which includes a forming mechanism which is lever-operated to create a selected contour.

A further object of the subject invention is to provide a transportable/portable board bending machine which includes a cylindrical bar in combination with an L-shaped forming element to be lever-operated for forming an arcuate contour.

An additional object of the subject system is to provide a portable/transportable bending machine which incorporates a height adjusting mechanism, a forming mechanism, and a heating mechanism, all encompassed within one frame member.

A still further object of the subject system is to provide a transportable/portable bending machine which can be easily transported from one location to another.

Another object of the subject system is to provide a manually operated lever which is adjustable to provide a selected arcuate contour of an end section of a tile board.

The subject system is directed to a transportable/portable bending machine for arcuately contouring an end section of a substantially planar board member. The system includes a frame having a substantially planar frame base member and a heating assembly mounted within said frame below the frame base member to heat an end section of a board member to a temperature within a predetermined temperature range which forms the end section into a pliable state. A forming mechanism is provided which includes a cylindrical bar and a rotatable forming member for arcuately forming the end section of the board member around the cylindrical bar when the end section of the board member is heated to the predetermined temperature within the predetermined temperature range forming the pliable end section of the board member. The system includes an adjustable height mechanism to adjust a displacement distance between an upper surface of the planar frame base member and the cylindrical bar to accommodate differing thicknesses of the board member. An adjustable rotatable lever mechanism is connected to the forming mechanism and the cylindrical bar for arcuately displacing the forming mechanism through a predetermined and adjustable arc length.

DESCRIPTION OF PREFERRED EMBODIMENTS

Figure 1:
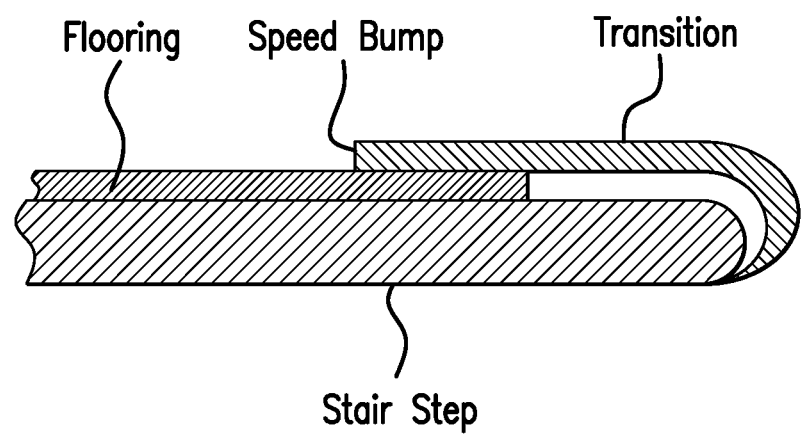
FIG. 1 is a cross-sectional view of a prior art arcuately contoured board member mounted on a stair step showing an interface with the flooring of the stair step and a speed bump with a transition mounting.
Figure 2:
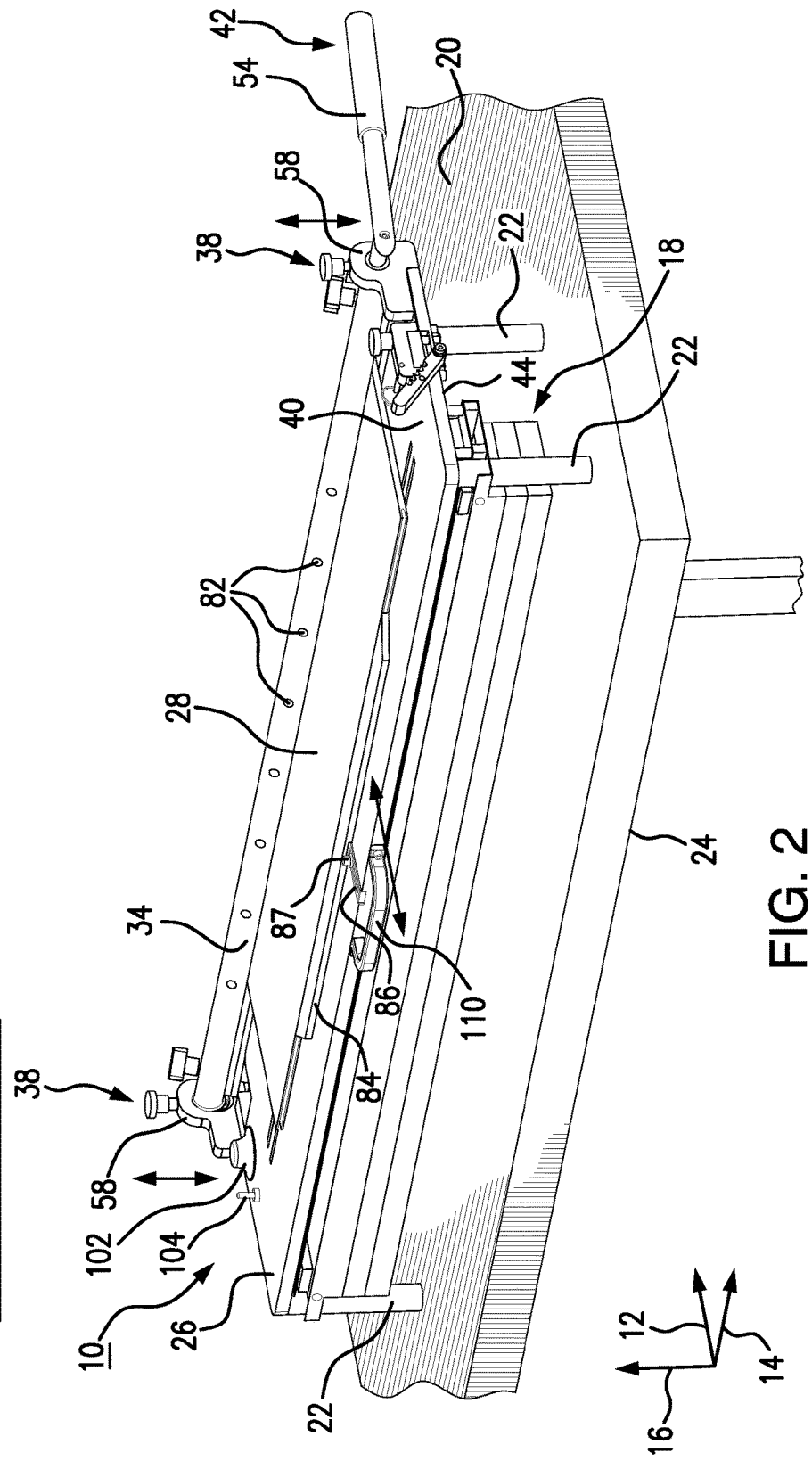
FIG. 2 is a schematic partially cut-away showing a perspective view of the transportable/portable bending machine where the tile board is sized prior to heating of an end section of the tile board.
Figure 3:
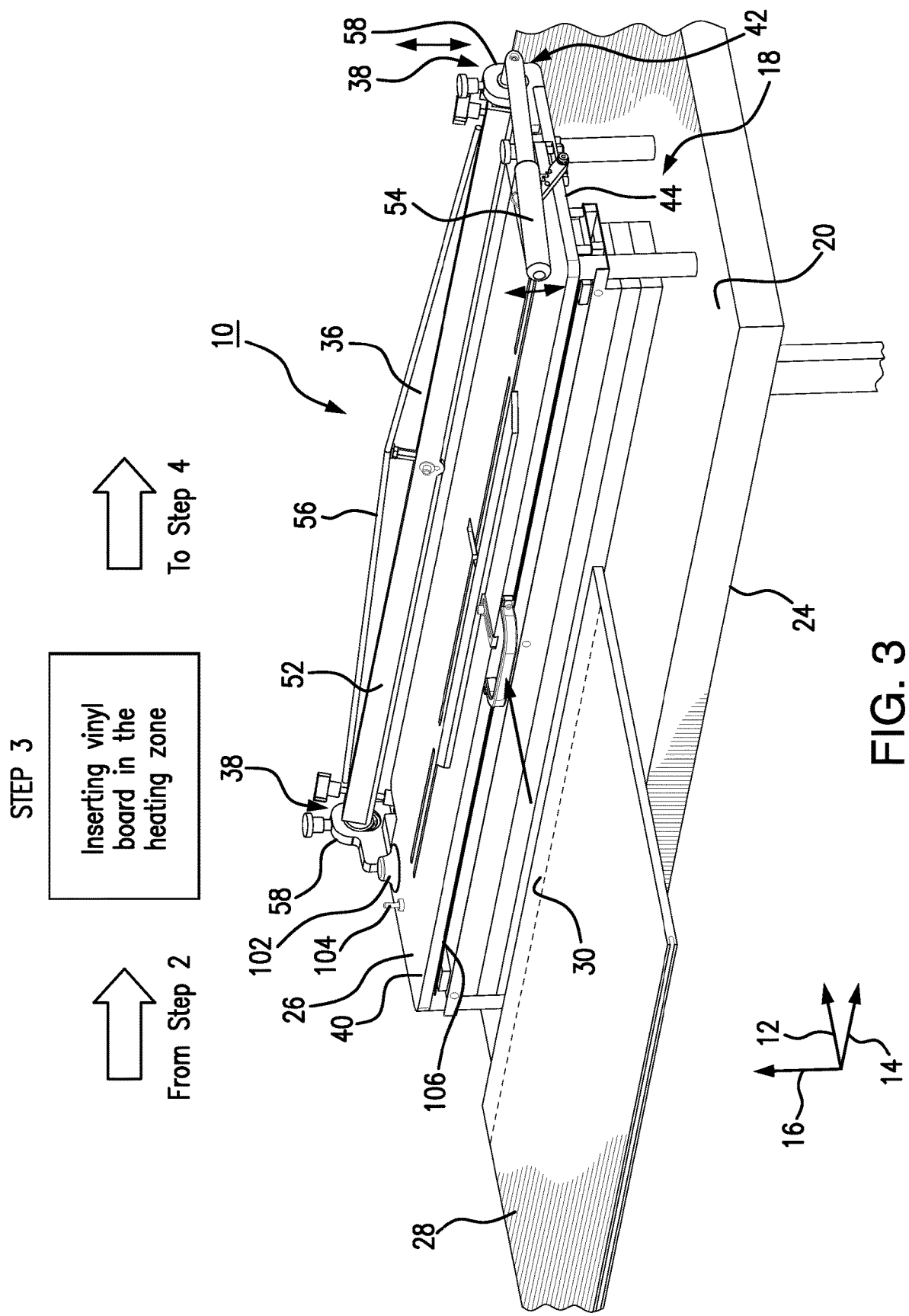
FIG. 3 is a partially cut-away perspective view of the transportable/portable bending machine showing the tile board or vinyl tile being prepared for insertion into an oven below a planar frame base member.

Referring to FIGS. 2-5, there is shown transportable bending machine 10 which is detailed in a series of sequential steps shown in FIGS. 2-5 for the process of arcuately contouring an end section 30 of a synthetic resin or plastic composition planar member 28. The end section 30 is depicted in FIG. 3 prior to insertion of the synthetic resin or plastic composition member 28 into transportable bending machine 10. The transportable bending machine 10 includes a planar frame base member 26 having a planar base upper surface 40 and an opposing planar base lower surface 44 as depicted in FIGS. 2-4 and 8B-8C.

FIG. 2 depicts the initiation of the step of contouring the synthetic resin or plastic composition member 28. The synthetic resin or plastic composition member 28 for purposes of this description may be referred to as vinyl board member or vinyl board. Differing vinyl boards 28 may have differing thicknesses extending in a vertical direction depicted by directional arrow 16. Thus vinyl board 28 is initially positioned on an upper surface 40 of the planar frame base member 26 for purposes of adjusting the height of a cylindrical bar 14 in relation to the upper surface of planar frame base member 26 in a manner to accommodate the particular thickness of the synthetic resin or plastic composition member or vinyl board 28 being contoured. The cylindrical bar 34 is brought into contact with an upper surface of vinyl board 28 through adjustable height mechanism 38 to be further described in connection with FIG. 7. The vinyl board 28 is thus sandwiched in a relatively snug manner between cylindrical bar or roller 34 and upper surface of planar frame base member 26 for sizing purposes of the transportable/portable machine 10 in relation to a selected vinyl board 28. Initial placement of synthetic resin or plastic composition member 28 is facilitated through the use of stabilization bar 84 which bears against a side surface of vinyl board 28. Stabilization bar 84 is displaceable in a longitudinal direction 12 and can be fixed to planar frame base member 26 at a selected position for stabilizing vinyl board 28 on planar frame base member 26 for the step of adjusting the distance or gap between cylindrical bar 34 and upper surface 40 of the planar base frame member 26. Once the sizing of the gap between the cylindrical bar member 34 and the upper surface 40 has been completed (by the height adjusting mechanism 38), vinyl board 28 is removed from the transportable/portable bending machine 10 and is readied for the heating step of the vinyl board 28. It is to be understood that the sizing can either be accomplished initially, such sizing can be accomplished during a warm-up period of heating mechanism 88 to be further described.

The heating of vinyl board 28 is initiated by actuating the heating mechanism 88 through a thermostatic control, to heat vinyl board to a temperature where end section 30 has attained a pliable state. Differing vinyl board pliability states are a function of the particular vinyl board 28 composition, however a temperature range of between 250 degrees Fahrenheit and 350 degrees Fahrenheit is a general range for forming the end section into a pliable state. The heating is accomplished electrically by use of a standard 110v plug/connector.

Figure 10:
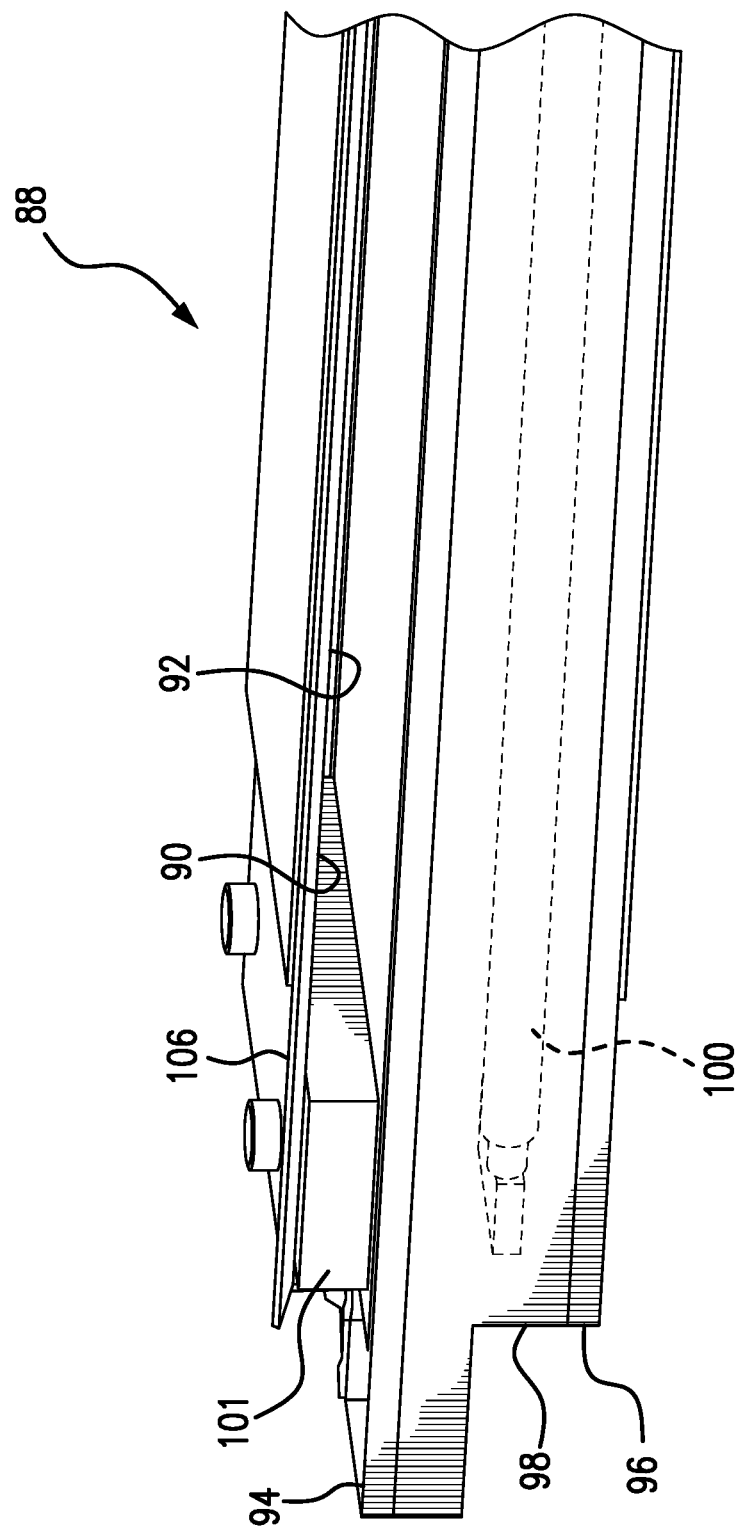

Referring now to FIG. 3, once the heating mechanism has reached a pliability temperature of the particular vinyl board 28 being contoured, the vinyl board 28 is inserted into heating mechanism or heating assembly 88 as further detailed in relation to the description of FIG. 10 in following paragraphs. Heating is accomplished through the heating oven 90 which heats the end section 30 of the vinyl board 28 to a selected temperature where the vinyl board end section becomes pliable. It is to be understood the sizing of the gap between the cylindrical or roller 34 and the upper surface of the upper surface 40 of the planar frame base member 26 can be adjusted during a time interval within the heating assembly is warming to the selected temperature setting through the same procedure as was indicated in the description of FIG. 2 by using another vinyl board 28 having a thickness substantially the same as the vinyl board 28 being contoured by machine 10.

Figure 4:
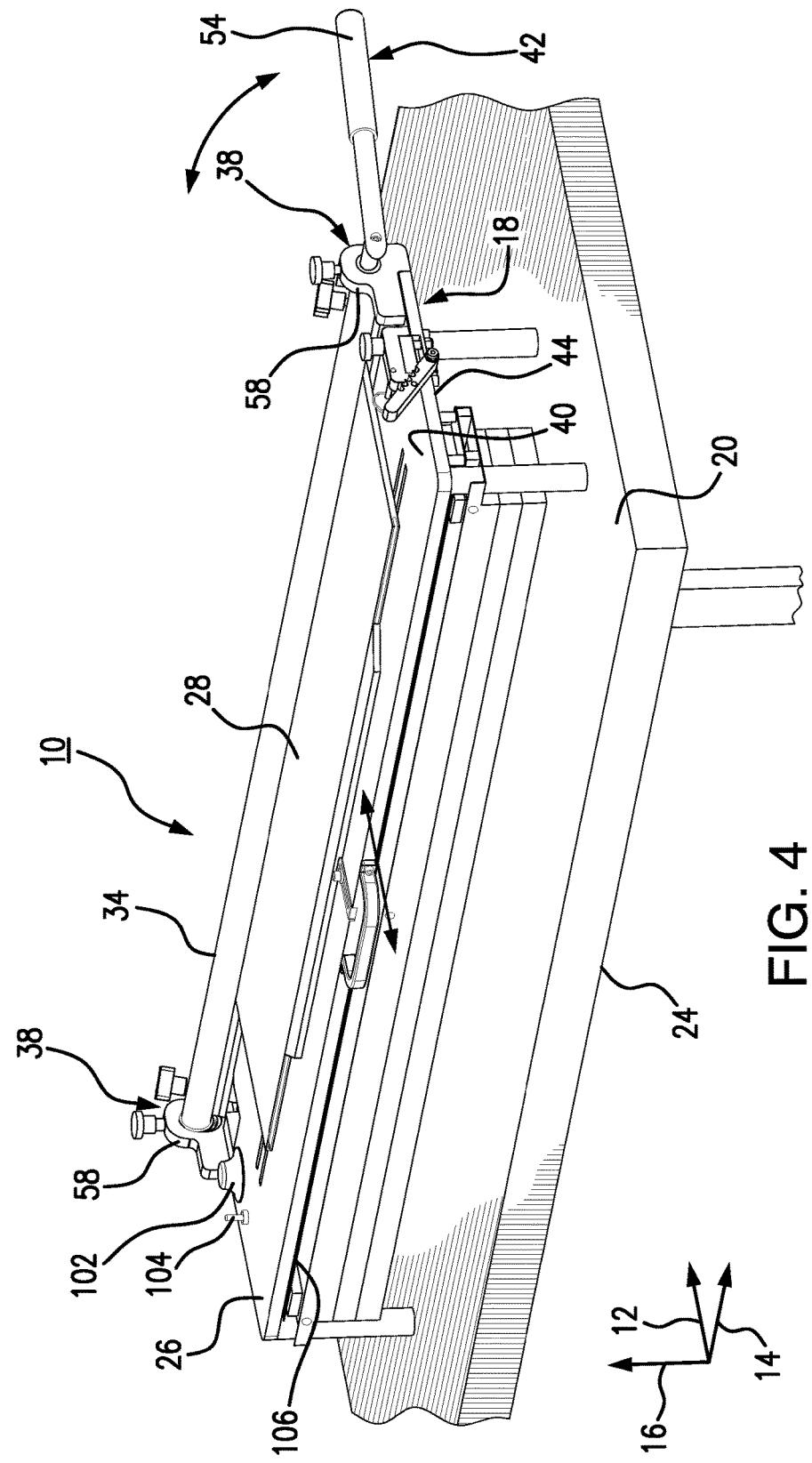
FIG. 4 is a partial perspective cut-away view of the inserted tile board having reached a predetermined temperature to form a pliable end section being inserted between a rolling bar and a forming mechanism.

Subsequent to the selected temperature being reached, as seen in FIG. 4, the synthetic resin or plastic composition board or member 28 is inserted into the gap between the roller or cylindrical bar 34 and a forming mechanism 32, to be described in connection with FIGS. 8A-8C. The vinyl board 28 is positioned against an end wall 52 of a forming element 46 prior to the contouring elements being activated and is prepared for the bending or contouring of the end section 30.

Figure 5:
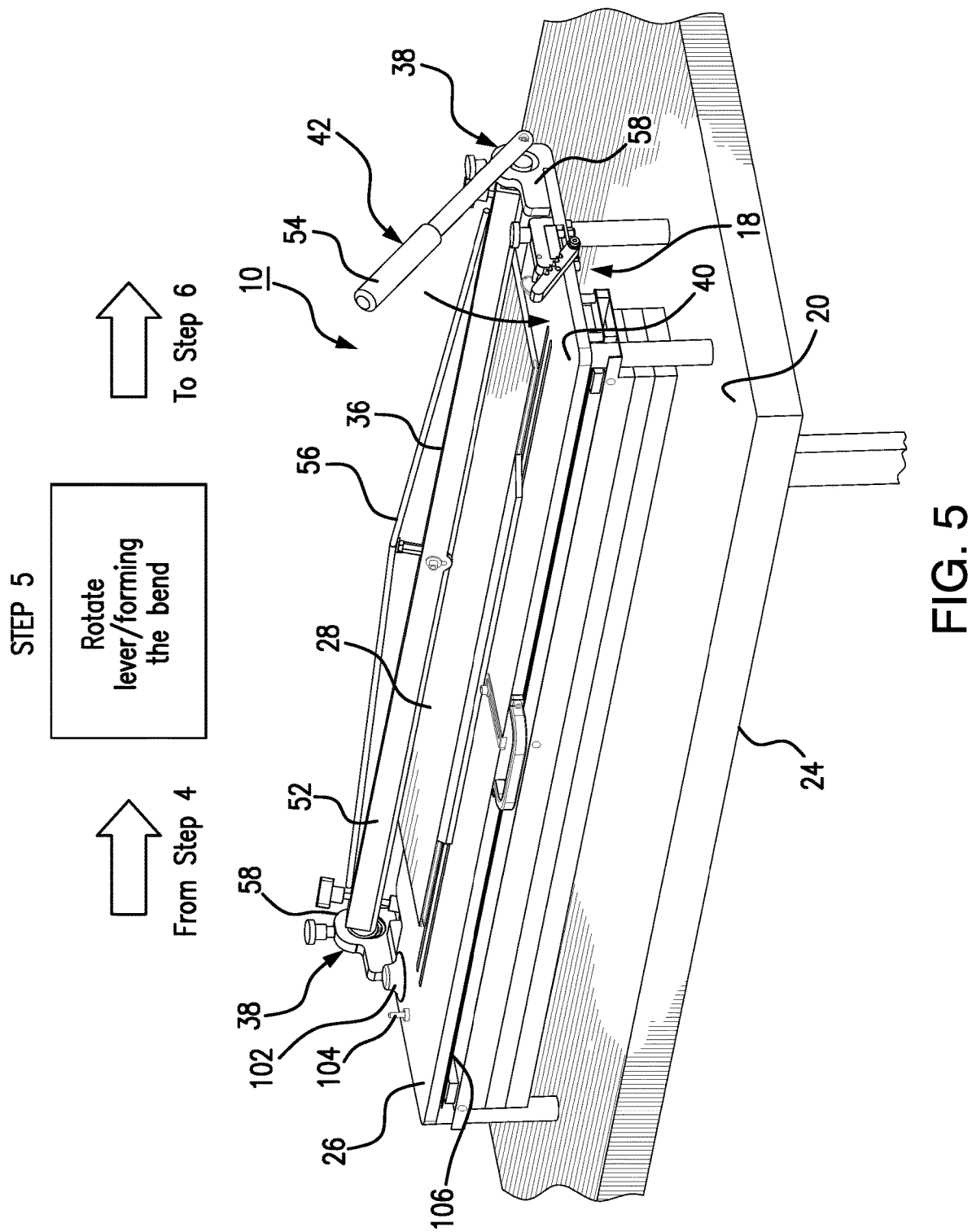
FIG. 5 is a partial perspective cut-away view of the transportable/portable bending machine where a lever member is rotated to form an arcuate section of the tile board.
Figure 8A:
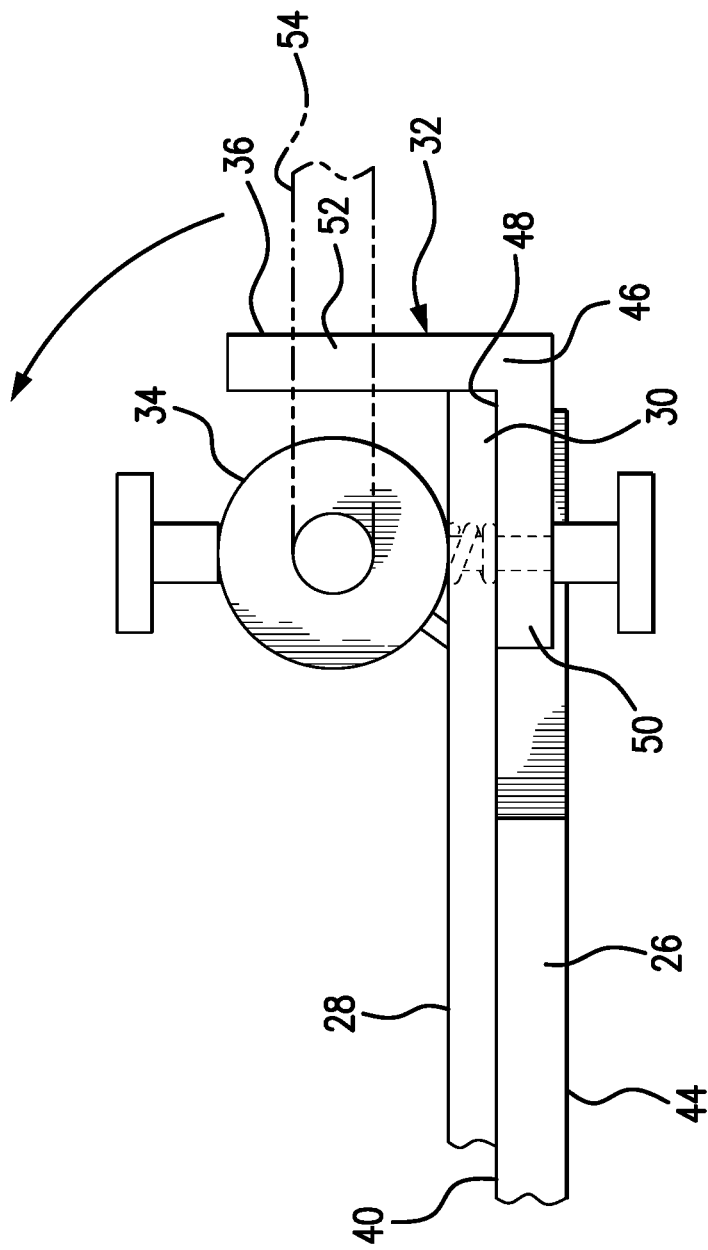
FIG. 8A is a schematic elevational view of a forming mechanism, prior to rotation of the forming mechanism to prepare an arcuate end section of the tile board.
Figure 8B:
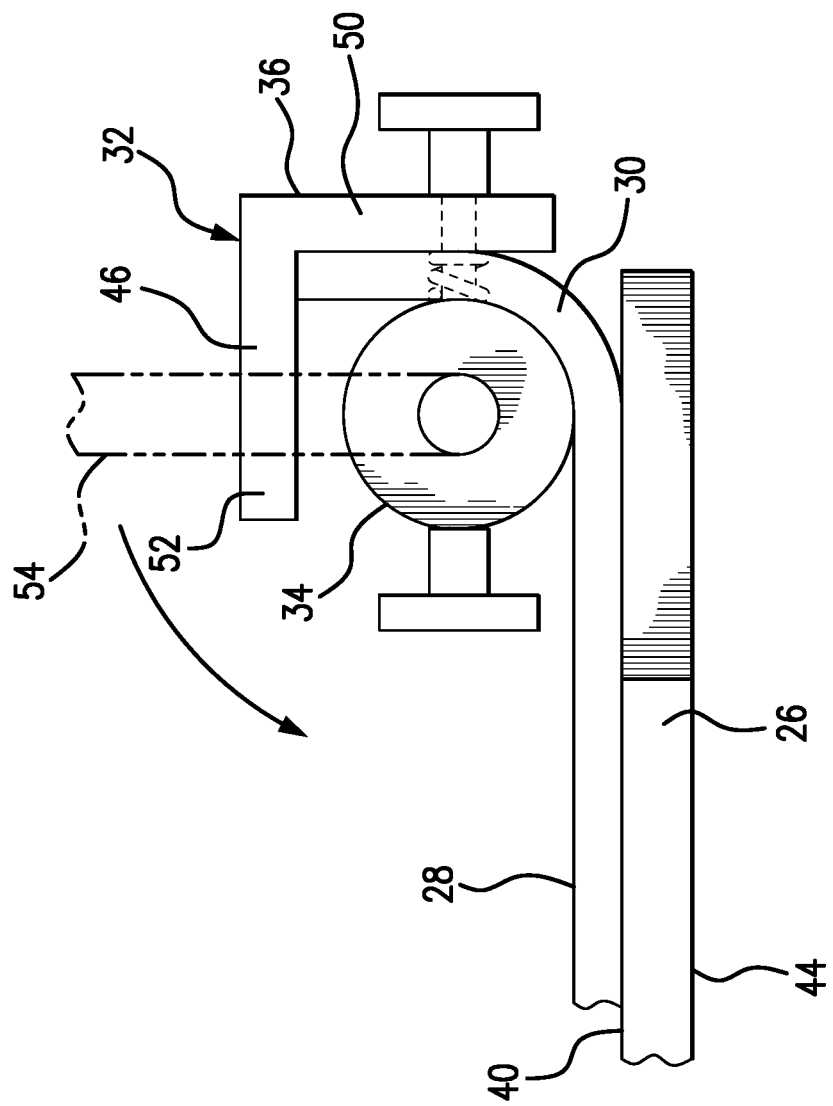
FIG. 8B is a perspective end elevational view of the forming mechanism during rotation of the lever member showing the end section of the tile board partially formed.
Figure 8C:
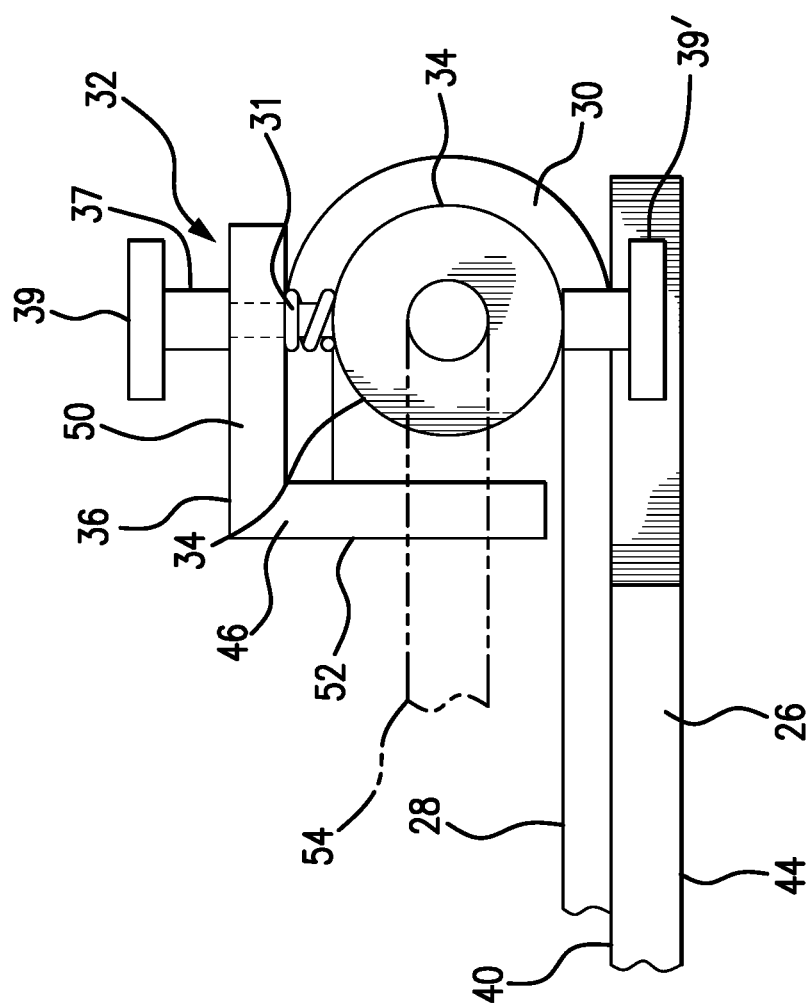
FIG. 8C is a further perspective elevational schematic view of the forming mechanism at the completion of an arcuate contouring of the end section.

Referring now to FIG. 5, the machine 10 is now actuated by rotational displacement of the lever bar member 54 to arcuately contour the end section 30 as depicted in FIGS. 8A-8C through a responsive rotation of roller or cylindrical bar member 34 and forming mechanism 32 to be further developed in relation to FIGS. 8A-8C. It is to be remembered that during the arcuate contouring the end section 30 remains in a pliable state to permit the end section 30 to be arcuately contoured.

Figure 6:
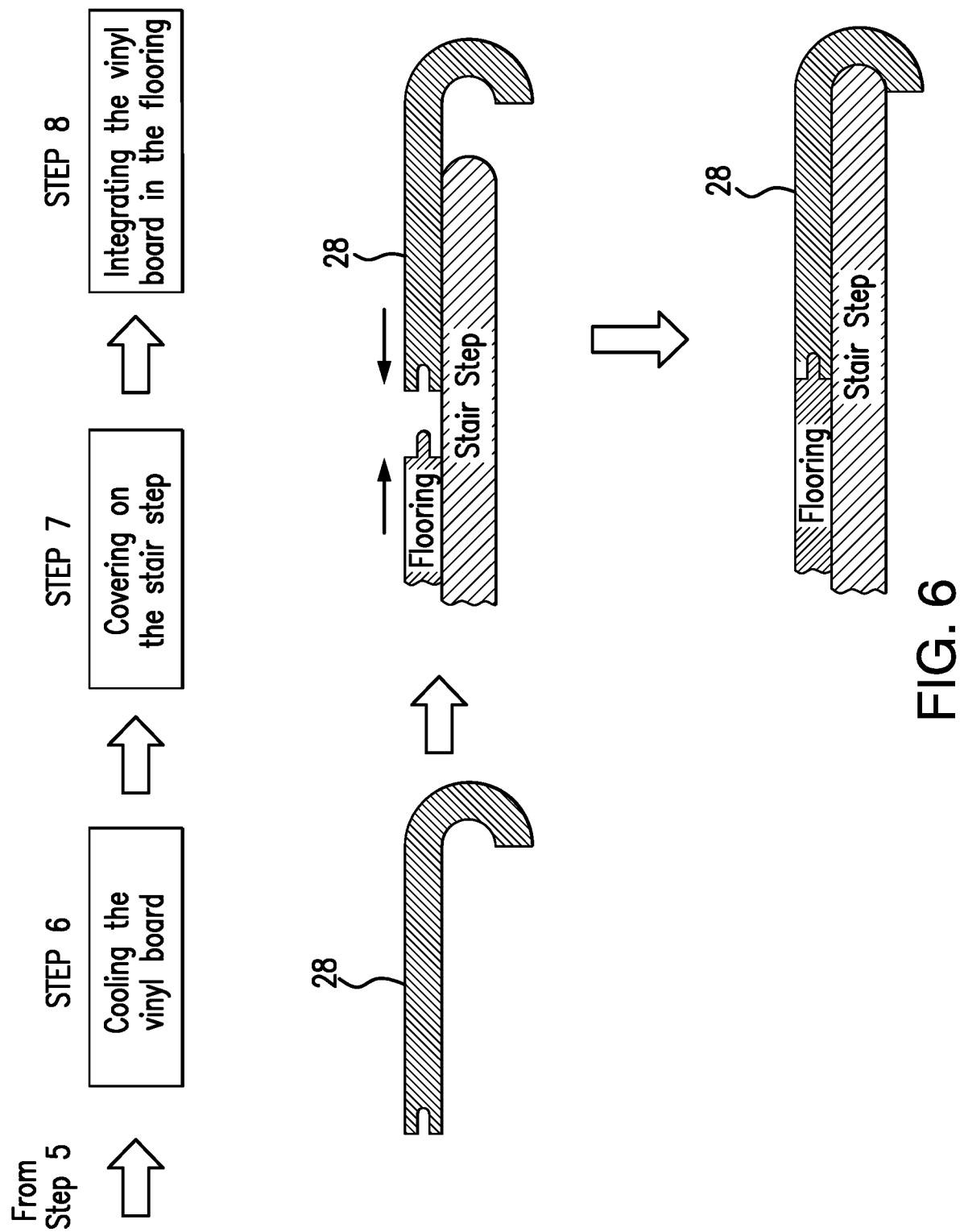
FIG. 6 is an exploded view of the method of showing an arcuately formed tile board being inserted in a flooring and mounted to the flooring in a seamless manner.

Once the arcuate contouring of the end section 30 is completed through actuation of the lever bar member 54, vinyl board 28 is permitted to remain positioned within the transportable/portable machine 20 for a period of time to effect cooling of the vinyl board 28 to a temperature where the vinyl board 28 is a rigid structure. Once having attained a rigid structure, the vinyl board is removed from machine 10. Subsequently, the vinyl board 28 is ready for installation on a stair step as seen in FIG. 6. The vinyl board includes an arcuately contoured end region having an insert notch which is mated to a lug section of the flooring and secured thereto as seen. Vinyl board 28 is then mated to the flooring in a substantially planar manner without any transition gap or speed bump.

Returning now to FIGS. 2-5, it is seen that transportable/portable bending machine 10 is defined by frame 18 which encompasses the mechanisms which form the bending or arcuately contouring of end section 30 of vinyl board member 28. Transportable and portable bending machine 10 is mounted on an external surface which may be an external table 24 or some other external surface which is substantially planar to provide a substantially stabilizing surface for operation of transportable/portable bending machine 10. Frame member 18 has attached thereto a set of frame legs 22 extending in vertical direction 16 which are secured to frame member 18 in a fixed manner such as by bolting or some like technique not important to the machine 10 concept as herein described with the exception that frame legs 18 are dimensioned to provide a substantially horizontal plane defining the upper surface 40 of planar frame base member 26. Alternatively frame legs 22 may be foldable with respect to other members of transportable/portable machine 10 to minimize the vertical length defined by directional arrow 16 of the overall transportable/portable bending machine 10 and aid in providing a more compact Package for transportability.

The forming mechanism 32, as shown in FIGS. 8A-8C and depicted in FIGS. 2-4 in combination with other mechanisms of transportable/portable bending machine 10 includes forming mechanism 32 which is seen to include rotatable cylindrical bar 34 and rotatable forming member 36 for arcuately forming end section 30 of synthetic resin or plastic composition member 28. FIG. 8A depicts the initial positioning of end section 30 of vinyl board 28 between cylindrically formed bar member 34 and the forming element base member 50 with the remaining portion of vinyl board resting on the upper surface 40 of the planar base member 26. The positioning of vinyl board member 28 shown in FIG. 8A is subsequent to the heating of end section 30 to a pliable state and readied for the arcuate forming process. FIG. 8B depicts the partial rotation of the lever bar member 54 during the bending or arcuately contouring of end section 30 which acts in cooperation with cylindrical bar member 34 to provide a corresponding arcuate contour to end section 30. FIG. 8C is a depiction of a substantially completed rotation of lever bar member with end section 30 contoured for installation.

As is seen in FIGS. 2-4, cylindrical bar 34 extends in a transverse direction defined by the directional arrow 14. As is further seen in FIG. 8A, synthetic resin or plastic composition planar member 28 is initially (after heating) mounted against vertically directed forming wall member 52 of forming mechanism 32 after the height between cylindrical bar 34 and an upper surface of synthetic resin or composition member 28 has been adjusted by the adjustable height mechanism 38, to be further detailed in following paragraphs. Synthetic resin or plastic composition planar member 28 is mounted in a planar contiguous mounting on upper surface 40 of the planar frame base member 26 and on forming element base member upper surface 46. Vertically directed forming wall member 52 acts as a stop for a terminal end of end section 30 of synthetic resin or plastic composition member 28.

Forming element 46 which is composed of a one-piece formation of forming base member 50 and vertically directed forming wall member is "L-shaped" in contour as is seen in FIGS. 8A-8C. A rotation of end section 30 is initiated by actuation of a lever bar member 54 as is now seen in FIG. 8B where rotatable forming member 36 provides for a partial arcuate contour and in FIG. 8C where rotatable forming member 36 has been rotated through 180 degrees arc rotation. In this manner, an arcuate end section 30 is processed.

Forming element base member 50 is spring biased for displacement of cylindrical bar 34 by a capturing spring member 31 positioned between forming element base member 50 and cylindrical bar 34. As is seen in FIGS. 8A-8C, a forming threaded member 37 passes through forming base member 50 and is threaded thereto. Opposing caps or forming knobs 39-39' are rotated to displace forming member 50 for positioning of cylindrical bar 34. Capturing spring member 31 is positioned between forming element base member 50 and cylindrical bar 34. The forming threaded member 37 is threaded to the forming base member 50. The capturing spring 31 is sandwiched between forming base member 50 and the transversely directed cylindrical bar 34. In this manner, a rotation of the cylindrical bar member 34 causes a responsive rotation of forming element 46.

The base member capturing spring member 31 may be a coil spring as is shown and snuggly mounts cylindrical bar 34 to an upper surface of end section 30 of synthetic resin or plastic composition member 28. A lever member 54, to be further detailed in following paragraphs, is coupled to the cylindrical bar member 34 and to forming element 46 for actuating rotation of forming element 46. The lever bar member 54 is fixedly coupled to cylindrical transversely directed bar member 34. The forming threaded member 37 which is threaded to the forming base member 50 as shown extends through the cylindrical bar member 34 and rotational actuation of forming cap member 39 causes a force to be applied to sandwiched capturing spring member 31 which provides for a coupling of rotatable forming member 36 to cylindrical bar member 34. Thus a rotation of cylindrical bar member 34, by rotation of the lever member 54 causes a responsive rotation of forming mechanism 32 to provide a responsive displacement of forming element 46.

Forming element 46 extends in transverse direction 14 and in order to maintain the structural integrity of forming element 46 of forming mechanism 32, a truss member 56 is (mounted as seen in FIG. 5) to opposing ends of forming base member 50. The truss mechanism 56 is provided to maintain a substantial plane of forming base member 50 for avoiding bending or warping of forming mechanism 32 during operation. Thus, truss mechanism 56 is secured to opposing ends of forming element 46 for increasing the overall structural integrity of forming element 46 as well as to prevent any deformation of forming mechanism 32 and associated forming element 46 during the process of bending end section 30 of synthetic resin or plastic composition member 28.

Figure 7:
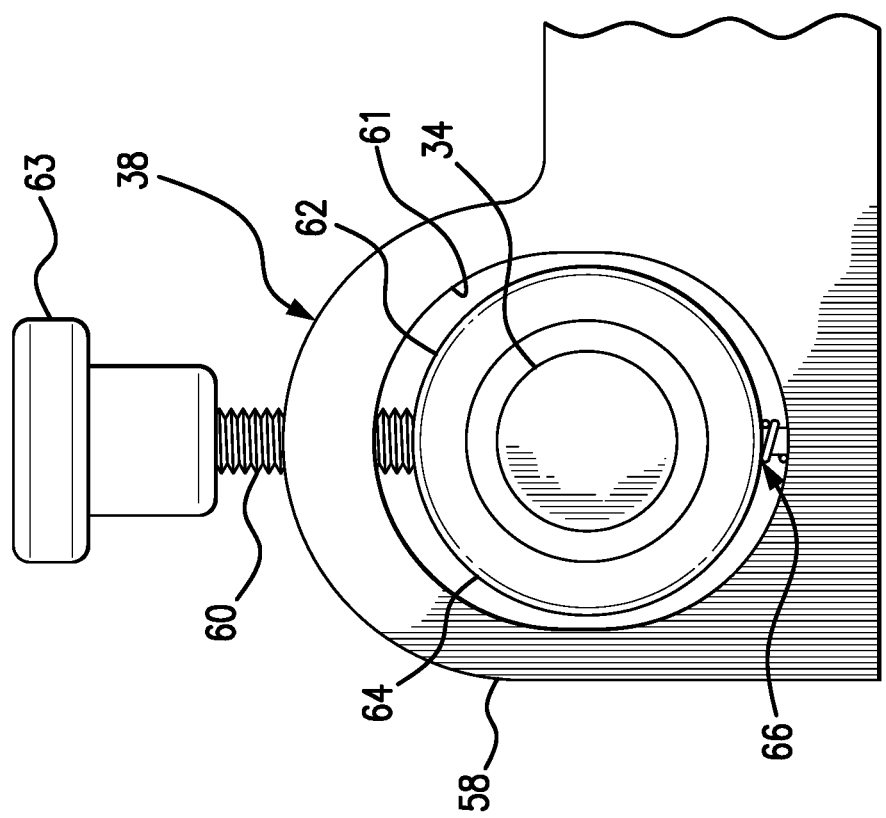
FIG. 7 is a schematic view of an adjustable height mechanism to adjust a displacement distance between an upper surface of an inserted tile board and a cylindrical bar.

Height adjusting mechanism 38 is depicted in FIGS. 2-5 and detailed in FIG. 7. In FIGS. 2-5, synthetic resin or plastic composition member 28 is inserted under cylindrical bar 34 and upper surface 40 of planar frame member 26 to obtain a sizing of the gap extending in a direction defined by vertical directional arrow 16. Once vinyl board 28 is inserted, the gap between cylindrical bar 34 and upper surface 40 of planar frame base member 26 is adjusted by adjustable height mechanism 38. Adjustable height mechanism 38 includes a pair of transversely displaced base flange members 58 (one of which is detailed in FIG. 7) which are fixedly secured to the planar frame base member 26 on opposing sides of transportable/portable bending machine 10. Fixed securement of the opposing base flange members 58 may be provided by bolting transversely displaced based flange member 58 to planar frame base member 26 or alternatively transversely displaced base flange member 58 may be formed in one-piece formation with the planar frame base member 26, not important to the machine concept as herein described, with the exception that each of opposing base flange members 58 are fixedly secured to the planar base member 26.

A pair of outer threaded height adjustment member 60 are provided with each extending through a respective base flange member 58 as is seen in FIG. 7. A pair of bearing members 62 associated with each associated with a respective base flange member 58 are positioned within a height adjusting passage 61. Bearing member 62 surrounds cylindrical bar 34 and is displaced therefrom in bearing gap 61. The outer height adjusting members 60 are threadedly engaged with a respective upper surface of each bearing member 62. A pair of height adjusting spring members 66 associated respectively with each of the transversely displaced flange members 58 are mounted within the gap between the gap formed between an inner surface of the base flange members 58 and the outer surfaces of the bearing members 62. Threaded height adjustment member 60 passes through an upper section of respective transversely displaced base flange members 58 and is threadedly secured thereto. A distal end of each outer threaded height adjustment members is contiguously in contact with an upper surface of each bearing member 62. A rotation of height adjustment cap 63 permits a force to be exerted on an upper surface of bearing member 62 for driving such against respective height adjustment spring members 66. In this manner, positioning and height adjustment of cylindrical bar 34 can be adjusted to accommodate different thicknesses of synthetic resin or plastic composition member 28 with respect to a vertical direction defined by directional arrow 16.

Rotation of height adjustment cap 63 about a vertical axis defined by directional arrow 16 will then displace height adjustment bearing 62 within gap or opening or passage 61 to specifically displace the height of cylindrical bar 34 for accommodating different thicknesses of synthetic resin or plastic composition member 28.

In the adjustment stage of the forming of synthetic resin or plastic composition member 28, the synthetic resin or plastic composition member 28 may be positioned in a stabilizing manner with respect to planar frame base member 26 through a stabilization bar 84 as seen in FIG. 2 which extends in transverse direction 14 and is mounted on the upper surface 40 of planar base frame member 26. Stabilizing bar member 84 may be selectively moveable in a longitudinal direction defined by longitudinal arrow 12 through a slot 86 extending in longitudinal direction 12 in combination with a stop knob 87 to position end section 30 of synthetic resin or plastic composition member 28 against vertically directed forming wall member 52 as is seen in FIG. 8A. In this manner, proper positioning of synthetic resin or plastic composition member 28 may be attained prior to a step of heating of the end section 30 of synthetic resin or plastic composition member 28 or stabilization can also be attained subsequent to heating.

Once the height adjustment has been made to accommodate differing thicknesses of synthetic resin or plastic composition member 28 is made, the synthetic resin or plastic composition planar member is then inserted into the a heating oven 90 having an insertion opening 92 for heating of the end section 30 of synthetic resin or plastic composition member 28. Spacers 101 are provided at opposing transverse ends of insertion opening 92 to provide an insertion opening having a sufficient opening size to accommodate differing sizes of vinyl boards.

Referring to FIG. 10, heating oven 90 includes a transversely directed heating element 100 which may be of a standard commercially available heating cable or alternatively a commercially available heating tape both of which are well known in the art. The heating element 100 is mounted within heater housing 98 having both a lower cover 96 and an upper heating cover 94. Thus, heating element 100 is contained within heater housing 98 for heating end section 30 of synthetic resin or plastic composition member 28 to a selected temperature within a predetermined temperature range necessary for providing a pliable end section 30.

Temperature control is maintained by thermostat 102 having a thermostat on/off switch 104. The combination of the thermostat 102 and heating element 100 are commercially available and known in the prior art. Insulation section or layer 106 may be mounted on the top of upper heating cover 94 and sandwiched between heating oven 90 and planar frame base member 26 in order to maintain a lower temperature of upper surface 40 of planar frame base member 26 with respect to the temperature of the heating element 100.

Subsequent to the heating of end section 30 of synthetic resin or plastic composition member 28 and the end section 30 being pliable, such is removed from heating oven 90 for insertion between the gap formed between the cylindrical bar 34 and the upper surface 40 of planar frame base member 26. The insertion of the synthetic resin or plastic composition member 38 is positioned as is seen in FIG. 8A and prepared for rotation to create the arcuate end section 30 as is provided in FIGS. 8B and 8C.

Figure 9:
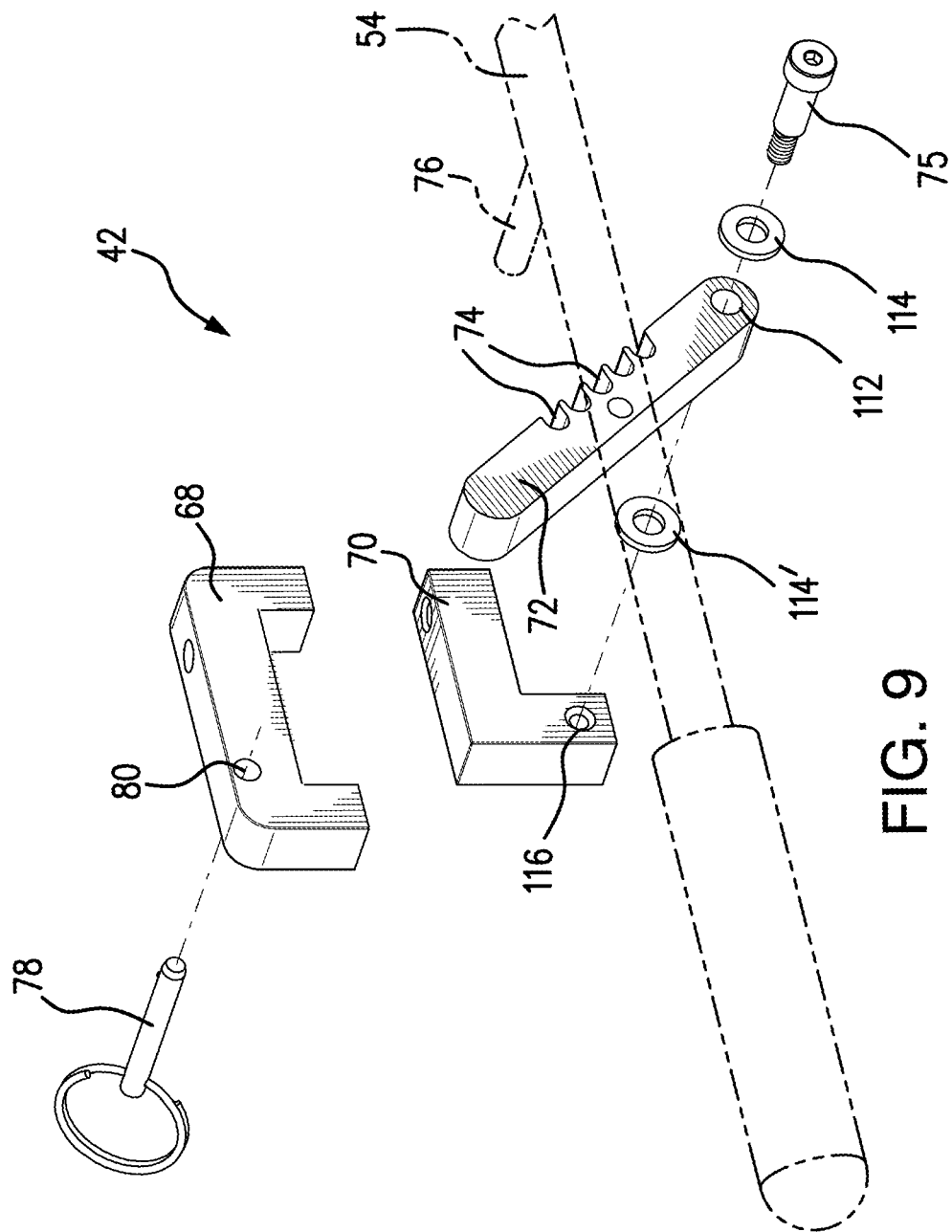
FIG. 9 is a perspective schematic view of a blow-out of elements for the adjustable and rotatable lever mechanism mounted to the forming mechanism and the cylindrical bar for arcuately displacing the forming mechanism through a selected arc length; and, FIG. 10 is a schematic perspective view of the oven area of the transportable and portable bending machine oven showing a heating element for heating a rigid tile board being inserted into an opening of the oven.

Referring now to FIG. 9, In order to accomplish the arcuate contouring of end section 30 of synthetic resin or plastic composition member 28, there is provided an adjustable and rotatable lever mechanism 42 depicted in FIGS. 2-5 and permits the operational arcuate contouring of end section 30 as is shown in FIG. 8A-8C. The adjustable and rotatable lever mechanism 42 is coupled to both the cylindrical bar 34 and the forming mechanism 32 for arcuately displacing the forming mechanism 32 through an adjustable arc link. Adjustable and rotatable lever mechanism includes the lever bar member 54 which is mounted to one end of the cylindrical bar 34 where rotation of the lever member 54 responsively rotates the cylindrical bar 34 and the forming mechanism 32 containing the end section 30 of the synthetic resin or plastic composition planar member 28. The adjustable and rotatable lever mechanism 42 as seen in FIG. 9 includes a lever catch block member 68 which is secured to planar frame base member 26 in fixed securement through bolting, threaded securement or some like technique. Lever catch block member 68 is in general a U-shaped member within which is inserted lever mount member 70. Lever mount member 70 is secured to a side of planar frame base member 26. Lever catch member 72 which is "L-shaped" in contour is secured to a side of planar frame base member 26 by threaded securement.

Lever catch member 72 is rotatably mounted to lever mount member 70 and includes a plurality of catch notches 74 as is seen in FIG. 9. Lever catch member 72 is mounted to lever mount member 70 by way of threaded securement by lever mount threaded member 75. Lever mount threaded member 75 extends through lever catch through opening 112 and is threadedly engaged with lever mount member 70 within lever mount threaded opening 116. As seen, lever catch member 72 has a pair of lever catch washers mounted on opposing surfaces of the lever catch member 72.

Lever member 54 includes an extending lever pin 76 which is adapted to be received in a selected one of the catch notches 74 upon rotation of lever member 54 into engagement with lever catch member 72. When the lever catch member 72 is set at a selected rotational angle, rotation of lever member 54 is terminated when lever pin 76 is inserted in one of the catch notches 74 and in turn affects the arcuate contour of end section 30.

In order to increase stability of transportable/portable machine, a locking pin 78 is insertable through locking pin through opening 80 formed through catch block member 68 passing over lever bar member 54 when machine 10 is to be transported. In this mode of operation lever bar member 54 is rotated to a near horizontal position and once locking pin 78 is inserted over the lever bar member 54, such blocks the lever bar member from rotation.

Turning back to FIG. 2, cylindrical bar 34 has a plurality cylindrical friction bar members 82 extending radially from a peripheral surface of cylindrical bar 34 with the cylindrical friction bar members being transversely displaced each from the other for aiding in the gripping of synthetic resin or plastic composition member 28 during a forming process.

The synthetic resin or plastic composition member 28 may be a vinyl composition which is substantially rigid in nature and pliable when heated by heating mechanism 88 to a predetermined temperature making the end section 30 of the vinyl composition member 28 pliable in nature to permit the arcuate contouring of end section 30.

Although aspects of the present disclosure have been described in connection with specific forms and embodiments thereof, it will be appreciated that various modifications other than those discussed above may be resorted to without departing from the spirit or scope of the present disclosure as defined in the appended claims. For example, functionally equivalent elements may be substituted for those specifically shown and described, certain features may be used independently of other features, and in certain cases, particular locations of the elements may be reversed or interposed, all without departing from the spirit or scope of the present disclosure as defined in the appended claims.

What is claimed is:

1. A transportable/portable bending machine for arcuately contouring an end section of a synthetic resin or plastic composition planar member, comprising:
   (a) a frame having a substantially planar frame base member;
   (b) a heating assembly mounted within said frame below said substantially planar frame base member for heating an end section of said synthetic or plastic composition planar member to a temperature within a predetermined temperature range;
   (c) a forming mechanism defining a cylindrical bar and a rotatable L-shaped forming member, said cylindrical bar positioned within said L-shaped rotatable L-shaped forming member, for arcuately forming said end section of said resin or plastic composition planar member around said cylindrical bar when said end section of said synthetic resin or plastic composition planar member is heated to said temperature within said predetermined temperature range forming a pliable end section of said synthetic resin or plastic composition planar member;
   (d) an adjustable height mechanism for adjusting a displacement distance between an upper surface of said planar frame base member and said cylindrical bar; and,
   (e) an adjustable and rotatable lever mechanism coupled to said forming mechanism for arcuately displacing said forming mechanism through a predetermined and adjustable arc length.

2. The transportable/portable bending machine as recited in claim 1 where said heating assembly is fixedly secured to said frame below a lower surface of said substantially planar base member.

3. The transportable/portable bending machine as recited in claim 2 including a thermal insulation member sandwiched between said heating assembly and said lower surface of said planar frame base member.

4. The transportable/portable bending machine as recited in claim 2 where said heating assembly includes a heating element selected from the group of: a heating tape or a heating cable.

5. The transportable/portable bending machine as recited in claim 4 where said heating element is mounted within a heating assembly housing having an upper cover and a lower cover, said heating assembly housing being mounted in said frame below said planar frame base member.

6. The transportable/portable bending machine as recited in claim 2 where said heating assembly includes a thermostat mounted to said planar frame base member for controlling the temperature of said end section of said synthetic resin or plastic composition planar member.

7. The transportable/portable bending machine as recited in claim 6 where said thermostat includes a thermostat knob mounted on said upper surface of said planar base member for selectively controlling the temperature of said synthetic resin or plastic composition planar member.

8. The transportable/portable bending machine as recited in claim 1 where said forming mechanism includes a forming element for releasably capturing said synthetic resin or plastic composition planar member between said cylindrical bar and said forming element.

9. The transportable/portable bending machine as recited in claim 8 where said forming element has a cross-sectional L-shaped contour where said end section of said synthetic resin or plastic composition planar member is inserted over and contiguous with a forming element base member upper surface of said L-shaped forming element.

10. The transportable/portable bending machine as recited in claim 9 where said forming element base member is formed in one piece formation with a forming element vertically directed wall member, said forming element vertically directed wall member providing a stop for further insertion of said synthetic resin or plastic composition planar member and acts in combination with said cylindrical bar to arcuately form said end section of said synthetic resin or plastic composition planar member upon actuation of said lever mechanism.

11. The transportable/portable bending machine as recited in claim 10 where said forming element base member is spring biased for displacement of said cylindrical bar by a capturing spring member positioned between said forming element base member and said cylindrical bar.

12. The transportable/portable bending machine as recited in claim 8 including a lever member coupled to said forming mechanism for rotationally displacing said forming element and said cylindrical bar whereby an end section of said synthetic resin or plastic composition planar member is arcuately formed.

13. The transportable/portable bending machine as recited in claim 8 where said forming mechanism includes a truss structure secured at least to opposing ends of said forming element for increasing structural integrity of said forming element.

14. The transportable/portable bending machine as recited in claim 1 where said adjustable height mechanism includes:
   (a) a pair of transversely displaced base flange members fixedly secured to said planar frame base member on opposing sides of said transportable/portable bending machine;
   (b) a pair of outer threaded height adjustment members with each extending through a respective base flange member;
   (c) a pair of bearing members within each of said base flange members, each of said bearing members surrounding said cylindrical bar associated with each of said transversely displaced base flange members, each of a pair of outer threaded height adjustment members contacting an upper surface of each of said bearing members respectively; and,
   (d) a pair of height adjusting spring members associated with each of said bearing members, positioned on respective opposing sides of said bearing members for sandwiching said bearing members between said spring members and said outer threaded height adjustment members.

15. The transportable/portable bending machine as recited in claim 14 where each of said spring members is a coil spring member.

16. The transportable/portable bending machine as recited in claim 14 where each of said outer threaded height members includes a height adjusting knob formed in one piece formation with each of said pair of outer threaded height adjustment members for displacement of each of said bearing members and said cylindrical bar to accommodate different thicknesses of said synthetic resin or plastic composition planar member.

17. The transportable/portable bending machine as recited in claim 1 where said adjustable and rotatable lever mechanism includes at least one lever member fixedly secured to at least one end of said cylindrical bar whereby rotation of said lever member responsively rotates said cylindrical bar and said forming member containing said end section of said synthetic or plastic composition planar member.

18. The transportable/portable bending machine as recited in claim 17 where said adjustable and rotatable lever mechanism includes:
   (a) a lever catch block member;
   (b) a lever mount member threadedly secured to said lever catch block, said lever catch block and said lever mount being fixedly secured to said planar frame base member;
   (c) a lever catch member rotatably mounted to said lever mount block member, said lever catch member being secured to said lever mount member at a selected angle therebetween for contacting said at least one lever member of said adjustable and rotatable lever mechanism when said at least one lever member is rotated.

19. The transportable/portable bending machine as recited in claim 18 where said lever catch member is threadedly secured to said lever mount member for determining a selected angle of said lever catch member with respect to said lever mount member.

20. The transportable/portable bending machine as recited in claim 18 where said rotatable lever mechanism includes
   (a) a series of catch notches formed within an upper surface of said lever catch member; and,
   (b) a lever pin secured to said at least one lever member for insert into a selected one of said catch notches.

21. The transportable/portable bending machine as recited in claim 17 where said adjustable and rotatable lever mechanism includes a locking pin formed on said at least one lever member and insertable through a locking pin through opening formed through said catch block member for releasably locking said adjustable and rotatable lever mechanism in a position where said at least one lever member is positioned for transportability of said transportable/portable bending machine.

22. The transportable/portable bending machine as recited in claim 1 where said synthetic resin or plastic composition planar member is a vinyl tile which is rigid at a temperature at or below room temperature.

23. The transportable/portable bending machine as recited in claim 1 where said cylindrical bar includes a series of cylindrical bar friction members extending from a peripheral surface thereof for frictionally engaging said planar base member upon rotation of said cylindrical bar.

24. The transportable/portable bending machine as recited in claim 1 including:
   (a) a stabilization bar extending in a transverse direction mounted on an upper surface of said planar frame base member, said stabilization bar being displaceable in a longitudinal direction; and,
   (b) a stabilization stop member extending from a longitudinally directed slot formed in an upper surface of said planar frame base member.

* * * * *